United States Patent [19]

Okumoto et al

[11] Patent Number: 5,103,841
[45] Date of Patent: Apr. 14, 1992

[54] PERFORATING APPARATUS FOR CYLINDRICAL ARTICLES

[75] Inventors: Yutaka Okumoto; Makoto Kakiuchi; Takao Furukawa; Shuichi Sato, all of Tokyo, Japan

[73] Assignee: Japan Tobacco Inc., Tokyo, Japan

[21] Appl. No.: 603,524

[22] Filed: Oct. 26, 1990

[30] Foreign Application Priority Data

Oct. 31, 1989 [JP] Japan ................... 1-281729

[51] Int. Cl.⁵ .................. B23K 26/00; A24C 5/60
[52] U.S. Cl. .................. 131/281; 131/282; 219/121.7; 219/121.77
[58] Field of Search .......... 219/121.67, 121.7, 121.71, 219/121.77; 131/281, 282

[56] References Cited

U.S. PATENT DOCUMENTS

| | | | |
|---|---|---|---|
| 4,121,595 | 10/1978 | Heitmann et al. | |
| 4,720,619 | 1/1988 | Mattei et al. | 219/121.7 |
| 4,767,909 | 8/1988 | Okumoto | 219/121.7 |
| 4,860,773 | 8/1989 | Okumoto et al. | 219/121.7 |
| 4,916,272 | 4/1990 | Okumoto et al. | 219/121.7 |

Primary Examiner—V. Millin
Assistant Examiner—J. Doyle
Attorney, Agent, or Firm—Birch, Stewart, Kolasch & Birch

[57] ABSTRACT

An apparatus according to the present invention, which is used to form a large number of fine pores in the peripheral surface of each of cylindrical articles, such as cigarettes, by means of a laser beam, comprises first and second perforating disks. A plurality of retaining arms are arranged on the respective peripheral edges of these perforating disks. The cylindrical articles are held by means of these arms, and are caused to move around the disks and rotate around their own axes. The cylindrical articles are alternately supplied half and half to the two perforating disks by means of two intermediate supply rollers. Beamsplitters are located individually in the respective central portions of the perforating disks. The laser beam emitted from a laser source is split into two beam halves by means of a pre-beamsplitter, and these beam halves are delivered individually to the beamsplitters. The beam halves delivered to these beamsplitters are radially split over a range of about 180°, and the split beams are applied to the cylindrical articles held by means of the retaining arms.

3 Claims, 4 Drawing Sheets

PERFORATING APPARATUS FOR CYLINDRICAL ARTICLES

BACKGROUND OF THE INVENTION

1. Field of the Invention

The present invention relates to a perforating apparatus for forming a large number of fine pores in the peripheral surface of a cylindrical article. More specifically, the present invention relates to a higher-speed apparatus for forming a plurality of fine pores in the peripheral surface of a filter of a filter cigarette by means of a laser pulse beam.

2. Description of the Related Art

Some filter cigarettes have a large number of pores in their peripheral surface. The cigarettes of this type are designed so that a smoker can inhale plenty of air through these pores while smoking, thereby enjoying a soft feeling of smoking. In these cigarettes, moreover, cigarette smoke can be diluted and lowered in temperature and in the contents of harmful ingredients.

Conventionally, an apparatus for perforating a large number of pores in filters of filter cigarettes is disclosed in Published Unexamined Japanese Patent No. 63-139375, 63-294773 (U.S. Pat. No. 4,860,773) by the inventor hereof. This apparatus comprises a rotatable perforating disk, and a plurality of retaining arms are arranged circumferentially on the peripheral edge portion of the disk. These retaining arms hold cigarettes supplied from a preceding process, and rotate around their own axes while moving around and together with the disk. The apparatus further comprises a laser pulse source for generating laser pulses and an optical system. The optical system radially splits a laser pulse beam by means of a beamsplitter, e.g., a conical polygon mirror, and radially applies the resulting split beams from the central portion of the perforating disk to the respective peripheral surfaces of the filters of the cigarettes held by means of the retaining arms.

In the conventional apparatus constructed in this manner, the pulsative laser beams are applied to the peripheral surfaces of the filters of the cigarettes held on the retaining arms as the cigarettes rotate around their own axes, whereby a plurality of fine pores are bored at fine intervals in the peripheral surfaces of the filters. In this apparatus, moreover, all of its principal moving parts, including the perforating disk and the retaining arms, rotate, so that high-speed operation is easy, and the cigarettes can be processed in plenty.

If the apparatus of this type is set in a production line for cigarettes, the number of cigarettes supplied per unit time from a preceding process, such as a cigarette manufacturing apparatus, must naturally be equal to the number of cigarettes processed per unit time in this perforating apparatus. In the cigarette production line, the supply of cigarettes per unit time is very large, so that the operating speed of the apparatus must be made as high as possible.

In this conventional perforating apparatus, each retaining arm is provided with a vacuum chuck mechanism for holding a cigarette, a gear mechanism for rotating the chuck mechanisms around their own axes, etc., and the circumferential intervals of arrangement of the arms cannot be made very short. If the number of cigarettes received per unit time by the retaining arms is made equal to the large number of cigarettes supplied from the preceding process, the circumferential speed of the perforating disk will become extremely high. As a result, a greater centrifugal force acts on the cigarettes held on the retaining arms, so that the arms become unable to retain the cigarettes. Thus, the limit of the operating speed of the conventional apparatus depends on the limit of the circumferential speed of the perforating disk.

Disposed beside the perforating disk, moreover, are supply and delivery mechanisms, such as a supply roller for supplying the cigarettes to the retaining arms, a delivery roller for delivering the cigarettes from the arms, etc. Accordingly, the cigarettes held by means of the retaining arms must finish making at least one revolution around their own axes, thereby accomplishing perforation, before they are discharged by means of the delivery roller after being supplied from the supply roller. If the supply and delivery rollers are situated at an angular distance of 180° with respect to the perforating disk, for example, the cigarettes finish being perforated while being transported between these rollers, that is, while the perforating disk rotates through 180°. Thus, no cigarettes are held on the retaining arms in the remaining 180° range. Meanwhile, the optical system of this apparatus is arranged so that the beamsplitter radially splits and applies the laser beams throughout the circumference, that is, over the range of 360°. In the remaining 180° range, therefore, laser pulses are applied to vacant retaining arms, resulting in a waste of the energy of the laser beams. In the conventional perforating apparatus, therefore, the output of the laser pulse source must be made high enough to compensate for the energy loss of the laser pulses. In order to increase the operating speed of the apparatus, however, the rotating speed of the perforating disk should be increased, so that the time intervals between the laser pulses must be shortened. Accordingly, the energy of each pulse is reduced, exerting a bad influence on the shape of the resulting pores. Thus, the aforesaid energy loss of the laser pulses is expected to be minimized.

SUMMARY OF THE INVENTION

The present invention has been contrived in consideration of these circumstances, and its object is to provide a perforating apparatus for cylindrical articles, such as cigarettes, capable of higher-speed operation with reduced laser beam energy loss.

In order to achieve the above object, a perforating apparatus according to the present invention comprises two perforating disks, a supply roller for receiving cylindrical articles from a preceding process, and two intermediate supply rollers disposed individually between the supply roller and the perforating disks. The intermediate supply rollers are used to alternately assign the cylindrical articles half and half to the two perforating disks, and from the roller 30 half and half to the first and second perforating disks 14a and 14b so that the cigarettes are distributed into the retaining arms 19 of the disks. Further, an optical system is used to halve a laser beam from a laser source by means of a pre-beamsplitter, and the resulting beam halves are split into a plurality of beams by means of a beamsplitter, and are applied from the respective centers of the perforating disks to the cylindrical articles, covering a range of 180°.

According to the present invention constructed in this manner, the two supplied cylindrical articles are assigned half and half to the two perforating disks, so that the rotating speed of the disks is half the conventional speed. Accordingly, the operating speed of the apparatus can be increased with ease. Furthermore, the laser beam is applied to the cylindrical articles, so as to cover the range of 180° from the center of each perforating disk, after being split into the beam halves. Thus, the laser beam is applied only to the desired range, so that its energy loss can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
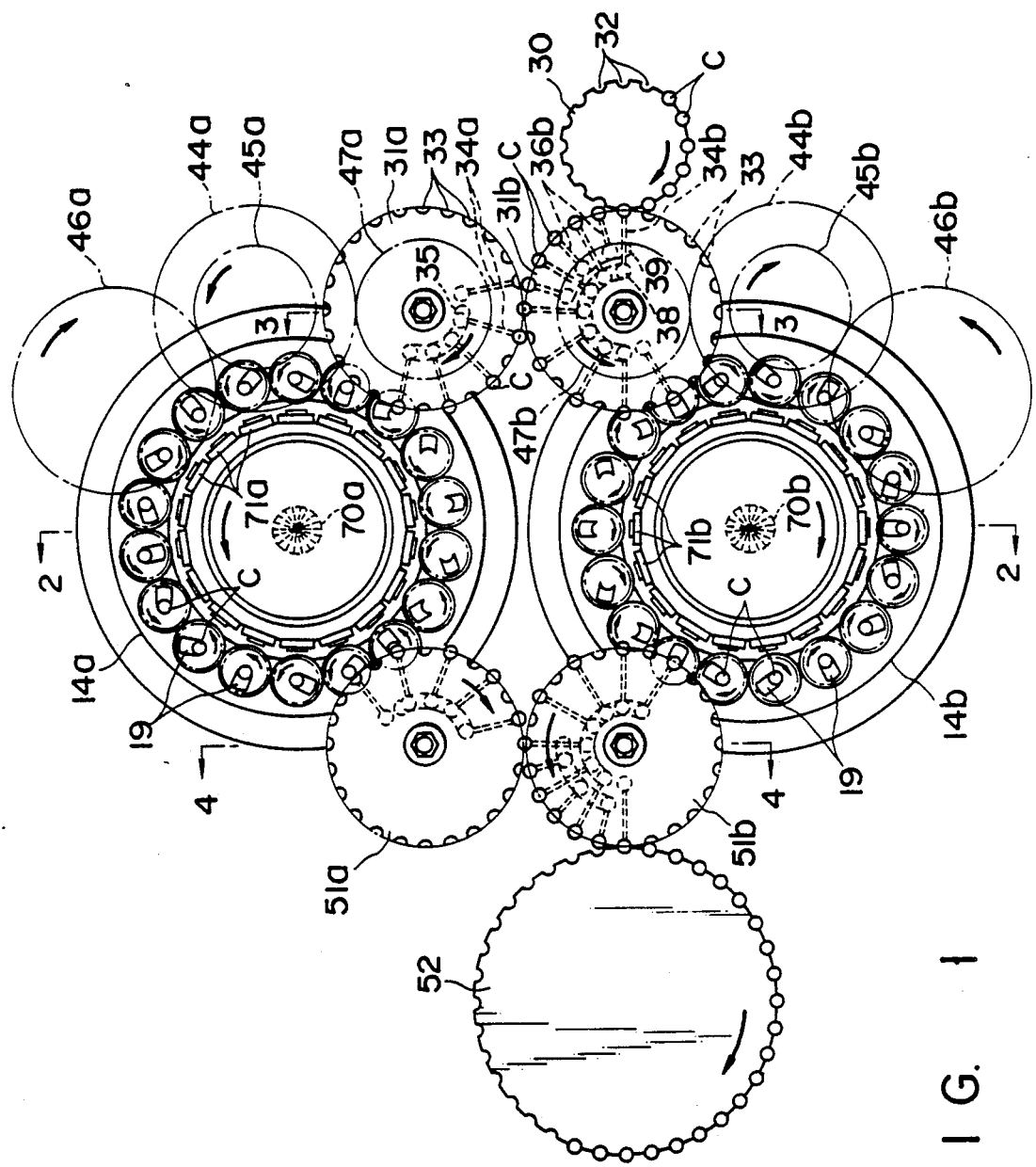
FIG. 1 is a front view of a perforating apparatus according to an embodiment of the present invention.

An embodiment of the present invention will now be described with reference to the accompanying drawings. This embodiment is a perforating apparatus which is used to form a large number of fine pores at predetermined fine intervals in the outer peripheral surface of a filter of filter cigarettes by means of a laser beam.

In the drawings, numerals 10, 11, 12 and 13 denote support plates which, arranged parallel to one another, constitute part of a frame of this apparatus. Two sleeves 15a and 15b are mounted penetrating the support plates 10 and 11 First and second hollow disk shafts 16a and 16b are passed through the sleeves 15a and 15b, respectively. These shafts are rotatably supported in their corresponding support sleeves 15a and 15b by means of bearings 17, individually. First and second perforating disks 14a and 14b are mounted on the distal end portions of the disk shafts 16a and 16b, respectively, so that they can rotate integrally with their corresponding shafts. Driving gears 18a and 18b are mounted on the proximal end portions of the disk shafts 16a and 16b, respectively. These gears are connected to a drive mechanism (not shown) so that the first and second disk shafts 16a and 16b are rotated in synchronism and at the same speeds with their corresponding first and second perforating disks 14a and 14b.

A plurality of retaining arms 19 are arranged on the peripheral edge portion of each of the perforating disks 14a and 14b. The proximal end portion of each arm 19 is rotatably supported on its corresponding disk by means of a bearing 20. Gears 21, which are mounted individually on the respective proximal ends of the arms 19, are in mesh with ring gears 22a and 22b. The ring gears are arranged coaxially around the outer peripheral surfaces of the support sleeves 15a and 15b, respectively, and are rotatably supported by means of their corresponding bearings 23. The gears 22a and 22b are connected to the aforesaid drive mechanism (not shown) so that they are rotated in association with the rotation of the perforating disks 14a and 14b. In this arrangement, the retaining arms 19 both move around and together with the disks 14a and 14b and rotate around their own axes. Each arm 19 makes three revolutions around its own axis while its corresponding perforating disk makes one revolution.

The distal end portion of each retaining arm 19, which is bar-shaped, axially projects from the front face of its corresponding perforating disk 14a or 14b. A retaining groove 28 having a substantially semicircular cross section is formed in the distal end portion of each arm 19, and a large number of suction holes 29 are bored in the base of the groove 28. The retaining arm 19 has a hollow therein, which constitutes a vacuum passage 24 with which the suction holes 29 communicate. Each vacuum passage 24 is connected to a vacuum mechanism (not shown) by means of an arcuate communication groove 25 in the support plate 10 and a vacuum pipe 26. Thus, cigarette C can be held individually in the respective retaining grooves 28 of the retaining arms 19 by suction under negative pressure. The communication grooves 25 are formed only in those ranges in which the cigarettes C are held to be perforated, e.g., those regions which correspond to the upper 240° range of the first perforating disk 14a and the lower 240° range of the second perforating disk 14b, as in FIG. 1.

A supply roller 30 and first and second intermediate supply rollers 31a and 31b are disposed in the vicinity of the perforating disks 14a and 14b. The supply roller 30, which is in the form of a disk, has a plurality of retaining grooves 32 on its peripheral surface. Cigarettes C delivered from a preceding process are received by the supply roller 30, and are held in the retaining grooves 32 under negative pressure, as in the case of the retaining arms 19. The second intermediate supply roller 31b is located, between the roller 30 and the second perforating disk 14b so that it is in contact with the respective outer peripheral surfaces of the other two. The intermediate rollers 31a and 31b serve to alternately assign the cigarettes C from the roller 3 half and half to the first and second perforating disks 14a and 14b so that the cigarettes are distributed into the retaining arms 19 of the disks.

Figure 3:
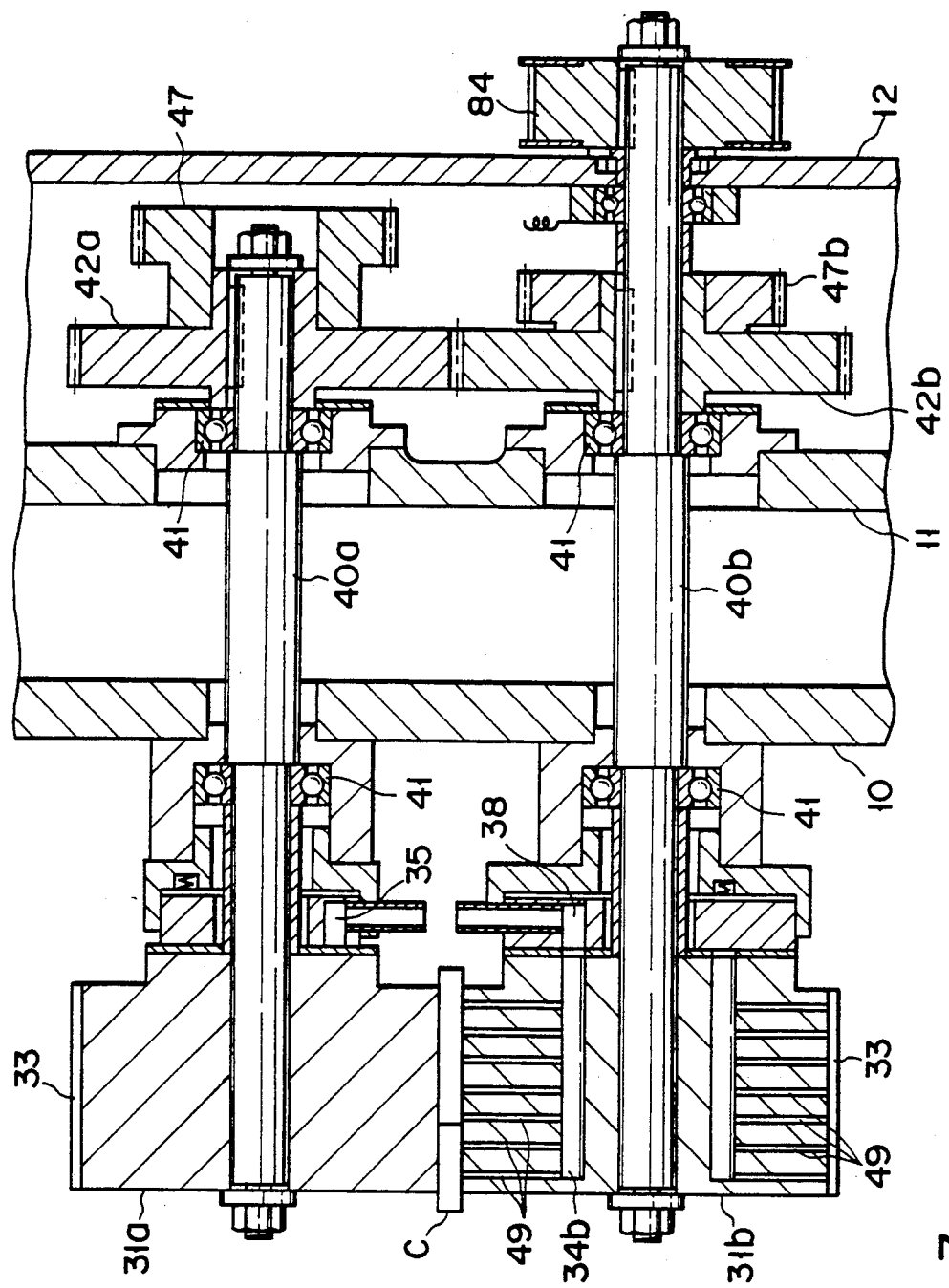
FIG. 3 is a vertical sectional view of intermediate rollers taken along line 3—3 of FIG. 1.

FIG. 3 shows the arrangement of the intermediate supply rollers 31a and 31b. The rollers 31a and 31b are mounted on the distal end portions of roller shafts 40a and 40b, respectively. The shafts 40a and 40b, which penetrate the support plates 10 and 11, are rotatably supported by means of their corresponding bearings 41. Synchronizing gears 42a and 42b are mounted on the proximal end portions of the roller shafts 40a and 40b, respectively. These gears 42a and 42b, which are in mesh with each other, are designed so that the shafts 40a and 40b, along with their corresponding first and second intermediate supply rollers 31a and 31b, can rotate in opposite directions in synchronism with each other. Driving gears 47a and 47b are mounted on the proximal ends of the roller shafts 40a and 40b, respectively. The gear 47a on the side of the first intermediate supply roller 31a is connected to the ring gear 22a on the side of the first perforating disk 14a by means of intermediate gears 44a, 45a and 46a, and is rotated in association with the rotation of the disk 14a and the rotation of its retaining arms 19 on their own axes. Likewise, the gear 47b on the side of the second intermediate supply roller 31b is connected to the ring gear 22b on the side of the second perforating disk 14b by means of intermediate gears 44b, 45b and 46b, and is rotated in association with the rotation of the disk 14b and the rotation of its retaining arms 19 on their own axes. The disks 14a and 14b and the rollers 31a, 31b and 30 are adjusted so as to rotate at the same circumferential speed.

A plurality of retaining grooves 33, each having a substantially semicircular cross section, are formed on the peripheral surface of each of the intermediate supply rollers 31a and 31b. The circumferential intervals of arrangement of the grooves 33 are equal to those of the retaining grooves 32 of the supply roller 30, and are half those of the retaining arms 19 of the perforating disks 14a and 14b. Vacuum passages 34a communicate with the respective base portions of alternate retaining grooves 33 of the first intermediate supply roller 31a by means of a plurality of suction holes 49. The respective distal end portions of these passages 34a communicate with the vacuum mechanism (not shown) by means of an arcuate communication groove 35. Further, vacuum passages 34b communicate with the respective base portions of alternate retaining grooves 33 of the second intermediate supply roller 31b by means of another set of suction holes 49. The respective distal end portions of these passages 34b communicate with the vacuum mechanism by means of an arcuate communication groove 38. The respective base portions of the remaining alternate retaining grooves 33 of the second intermediate roller 31b communicates individually with vacuum passages 36b by means of suction holes. The respective distal end portions of the vacuum passages 36b communicate with the vacuum mechanism by means of an arcuate communication groove 39 separate from the groove 38. The communication groove 35 of the first intermediate supply roller 31a extends between the position where the roller 31a is in contact with the second intermediate supply roller 31b and the position where the roller 31a is in contact with the first perforating disk 14a. Meanwhile, the communication groove 38 of the second intermediate supply roller 31b extends between the position where the roller 31b is in contact with the supply roller 30 and the position where the roller 31b is in contact with the second perforating disk 14b. The communication groove 39 extends between the position where the second intermediate supply roller 31b is in contact with the supply roller 30 and the position the roller 31b is in contact with the first intermediate supply roller 31a.

Thus, the cigarettes C held individually in the retaining grooves 32 of the supply roller 30 are first delivered to the individual retaining grooves 33 of the second intermediate supply roller 31b, and are held sucked in the grooves 33. As mentioned before, the communication groove 39 extends only up to the position where the second intermediate supply roller 31b is in contact with the first intermediate supply roller 31a. When alternate retaining grooves 33 of the second intermediate supply roller 31b move to this position, therefore, the cigarettes C in these grooves are released from the retention by suction, and are delivered to alternate retaining grooves 33 of the first intermediate supply roller 31a. The cigarettes C received by the roller 31a are then delivered to the individual retaining arms 19 of the first perforating disk 14a. Meanwhile, the cigarettes C held in the remaining alternate retaining grooves 33 of the second intermediate supply roller 31b move as they are, and are delivered individually to the retaining arms 19 of the second perforating disk 14b. In this manner, the intermediate supply rollers 31a and 31b alternately assign the cigarettes C from the roller 30 half and half to the first and second perforating disks 14a and 14b so that the cigarettes are distributed into the retaining arms 19 of the disks.

Figure 4:
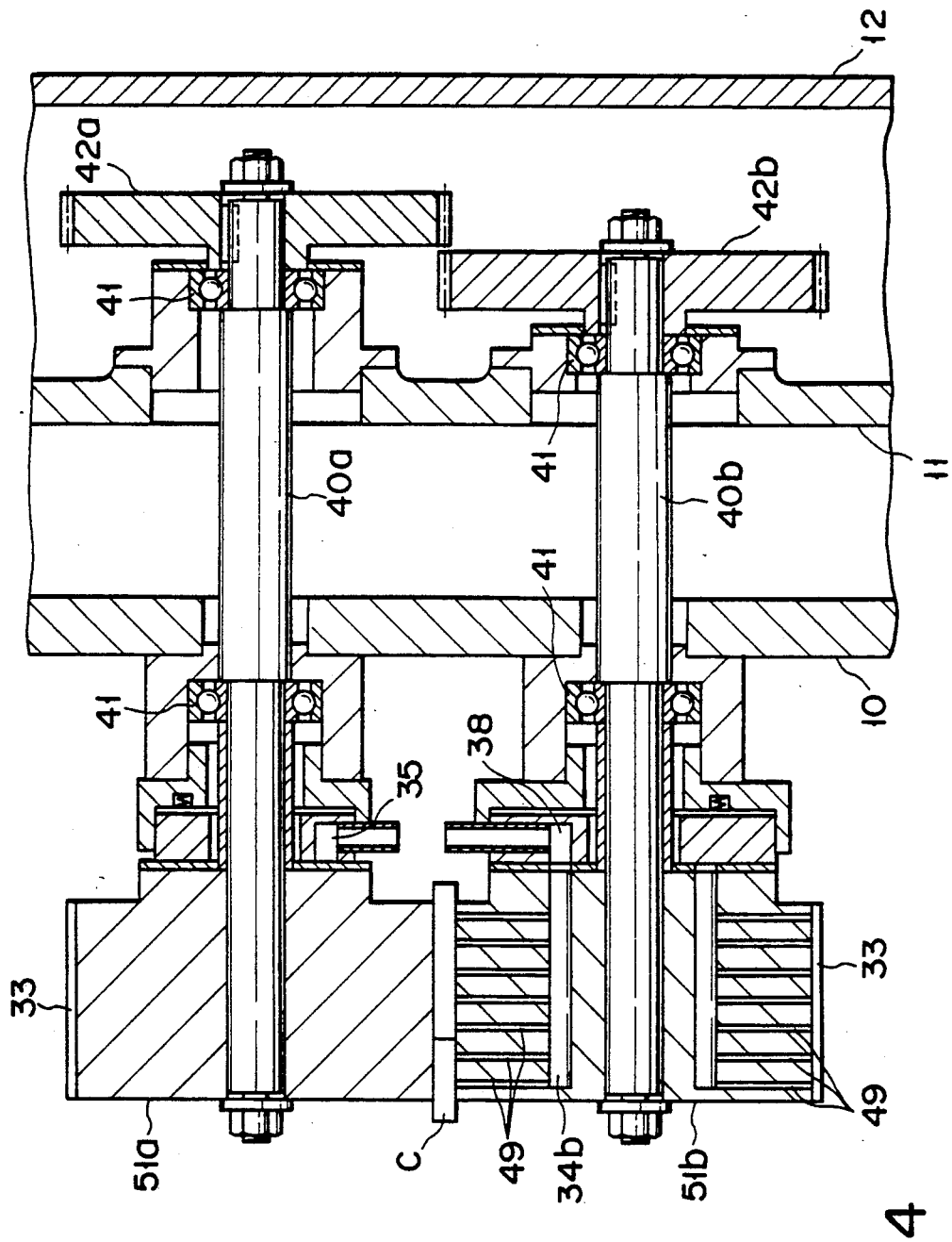
FIG. 4 is a vertical sectional view, of intermediate delivery rollers taken along line 4—4 of FIG. 1.

As shown in FIGS. 1 and 4, first and second intermediate delivery rollers 51a and 51b are arranged in positions symmetrical to the intermediate supply rollers 31a and 31b with respect to the first and second perforating disks 14a and 14b. These rollers 51a and 51b, which have the same construction as the rollers 31a and 31b, operate oppositely to the rollers 31a and 31b. More specifically, the rollers 51a and 51b receive the perforated cigarettes C from the retaining arms 19 of the first and second perforating disks 14a and 14b, and deliver them en bloc to a dilution drum 52 in the next stage. Since the intermediate delivery rollers 51a and 51b are constructed in the same manner as the intermediate supply rollers 31a and 31b, as mentioned before, like portions thereof are designated by like reference numerals in FIG. 4, and a detailed description of those portions is omitted. The dilution drum 52 serves to measure the amount of air flowing in through the pores bored in the cigarettes C, and determine whether the inflow is within a predetermined range. A detailed description of the arrangement of the drum 52 is omitted, since it has no immediate connection with the present invention.

The perforating apparatus is further provided with an optical system for boring a large number of pores in the outer peripheral surface of the filter of each of the cigarettes C, held by the retaining arms of the perforating disks 14a and 14b, by means of a laser beam. The following is a description of the arrangement of this optical system.

Figure 2:
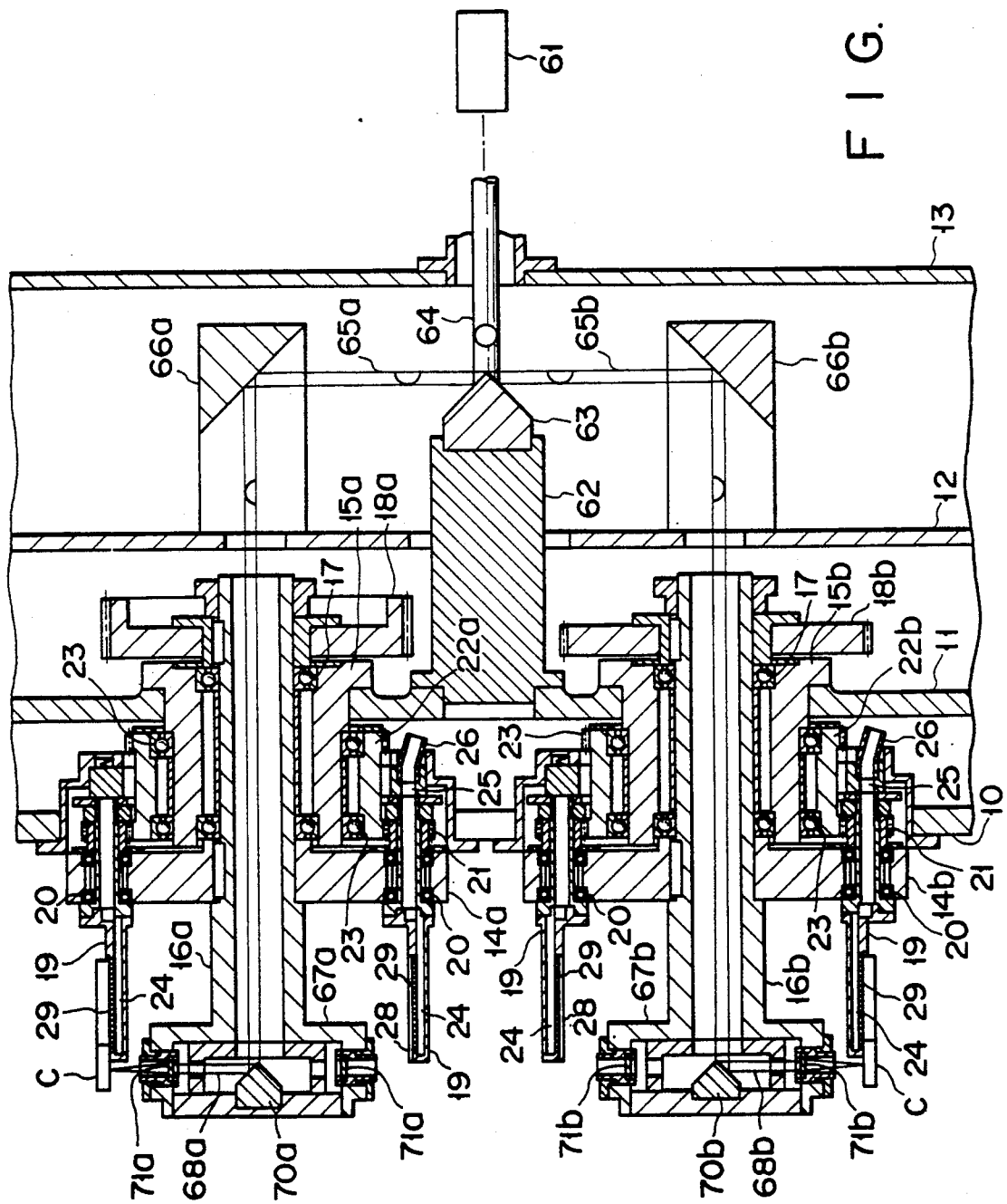
FIG. 2 is a vertical sectional view taken along line 2—2 of FIG. 1.

In FIG. 2, numeral 61 denotes a laser source, which pulsatively generates a laser beam 64 having a circular cross section at predetermined time intervals. A support member 62 protrudes from the support plate 11, and a pre-beamsplitter 63 is attached to the distal end of the member 62. The pre-beamsplitter 63, which has a chevron-shaped profile with the vertical angle of 90°, is designed so as to split the circular laser beam 64 from the laser source 61 into two beam halves 65a and 65b with a semicircular cross section and to reflect the beam halves at an angle of 90°. These beam halves 65a and 65b are further reflected at an angle of 90° by reflectors 66a and 66b, to be axially incident on the respective centers of the hollow disk shafts 16a and 16b of the first and second perforating disks 14a and 14b.

Heads 67a and 67b are mounted on the distal end portions of the disk shafts 16a and 16b, respectively, and beamsplitters 70a and 70b are attached to the heads 67a and 67b, respectively. The beamsplitters 70a and 70b, which are situated in the respective centers of the perforating disks 14a and 14b, are conical in shape, and have a large number of reflecting surfaces. The beamsplitters 70a and 70b split the incident circular laser beams into a large number of perforating beams 68a and 68b, and radially reflect them throughout the circumference. As mentioned before, however, the beam halves 65a and 65b incident on the beamsplitters 70a and 70b are two split beams each having a semicircular cross section, so that they are incident on a half portion of each corresponding beamsplitter, and the perforating beams 68a and 68b are radially reflected only for a semicircle, that is, only over the range of 180°. These perforating beams 68a and 68b are converged by means of a plurality of lenses 71a and 71b which are attached to the heads 67a and 67b, respectively, corresponding to the retaining arms 19. Thus, the beams 68a and 68b, forming small spots, are applied to the respective peripheral surfaces of the filter portions of the cigarettes C held by means of the retaining arms 19, for perforation. The ranges of emission of the perforating beams 68a and 68b are coincident with the ranges in which the cigarettes delivered from the intermediate supply rollers 31a and 31b move before they are delivered to the intermediate delivery rollers 51a and 51b, that is, the ranges of the upper half of the first perforating disk 14a and the lower half of the second perforating disk 14b, as in FIG. 1. Therefore, the cigarettes C, along with the retaining arms 19 which hold them, make one revolution around their own axes while moving in these ranges. As this is done, the pulsative perforating beams 68a and 68b are applied in succession to the outer peripheral surfaces of the filters, so that a large number of fine pores are formed circumferentially at fine intervals in the peripheral surface of each filter.

It is to be understood that the present invention is not limited to the embodiment described above, and that various changes and modifications may be effected therein by one skilled in the art without departing from the scope or spirit of the invention. In the above embodiment, all the cigarettes supplied from the supply roller are received by the second intermediate supply roller, and alternate cigarettes on the second intermediate supply roller are received by the first intermediate supply roller. Alternatively, however, the first and second intermediate supply rollers may be arranged so as to receive the cigarettes directly from the supply roller by turns, for example. The optical system for guiding the laser beam is not limited to the embodiment described above, and various other optical systems with the same function may be used depending on varied conditions. Moreover, the present invention is not limited to the arrangement for cigarettes, and may be also applied to an apparatus for forming fine pores in the outer peripheral surface of any other cylindrical article.

In the perforating apparatus of the present invention, as described herein, cylindrical articles supplied from the preceding process are alternately assigned half and half to the two intermediate supply rollers, and the assigned lots are delivered to the two perforating disks for perforation. Accordingly, the rotating speed of the perforating disks can be halved without reducing the article processing speed. Thus, the operating speed of the apparatus can be increased correspondingly.

According to the present invention, furthermore, the laser beam emitted from the laser source is halved, and the beam halves are delivered individually to the perforating disks, and are applied only to the range where the cylindrical articles are being transported. Thus, the energy of the laser beam can be effectively utilized, that is, its loss can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A perforating apparatus for forming a plurality of pores in the peripheral surface of each of cylindrical articles by means of a pulsative laser beam, said pores being arranged along the circumference of the cylindrical article, comprising:

first and second perforating disks adapted to be rotated in synchronism with each other;

a plurality of retaining arms arranged circumferentially at predetermined intervals on the respective peripheral edge portions of the first and second perforating disks, said retaining arms both moving around and together with the rotating disks and rotating around their own axes, and also holding the cylindrical articles so that the held cylindrical articles move around the disks and rotate around their own axes;

a supply roller adapted to receive the cylindrical articles continuously supplied thereto from a preceding process and temporarily hold the received cylindrical articles;

first and second intermediate supply rollers located between the supply roller and the first perforating disk and between the supply roller and the second perforating disk, respectively, and adapted to alternately receive the cylindrical articles half and half from the supply roller, and supply the received cylindrical articles to the first and second perforating disks;

first and second intermediate delivery rollers, said first intermediate delivery roller being located close to the first perforating disk and adapted to receive the perforated cylindrical articles from the first perforating disk, said second intermediate delivery roller being located close to the second perforating disk and adapted to receive the perforated cylindrical articles from the second perforating disk;

a laser source for emitting the pulsative laser beam; and an optical system for splitting the laser beam from the laser source into a plurality of beams and applying the split beams to the cylindrical articles held by means of the retaining arms, said optical system including two beamsplitters located individually in the respective central portions of the first and second perforating disks and adapted to split the laser beam into a plurality of radial split beams and apply the split beams to the cylindrical articles held by means of the retaining arms, and a pre-beamsplitter for splitting the laser beam from the laser source into two beam halves on a plane containing the axis of the beam and delivering the beam halves individually to the beamsplitters.

2. The apparatus according to claim 1, wherein said laser beam emitted from said laser source has a circular cross section, and said pre-beamsplitter splits the circular laser beam into two beam halves with a semicircular cross section.

3. The apparatus according to claim 1, wherein said retaining arms hold the cylindrical articles by suction using a vacuum.

* * * * *